United States Patent [19]

Stouffer et al.

[11] Patent Number: 5,540,868
[45] Date of Patent: Jul. 30, 1996

[54] PROCESS FOR PELLET FORMATION FROM AMORPHOUS POLYESTER

[75] Inventors: Jan M. Stouffer, Hockessin; Elwood N. Blanchard, Wilmington, both of Del.; Kenneth W. Leffew, Kennett Square, Pa.

[73] Assignee: E. I. Du Pont de Nemours and Company, Wilmington, Del.

[21] Appl. No.: 375,873

[22] Filed: Jan. 20, 1995

[51] Int. Cl.⁶ .......................... C08G 63/18; B29C 35/02
[52] U.S. Cl. .................. 264/13; 264/5; 264/345; 528/308.2
[58] Field of Search .................. 264/345, 348, 264/5, 13, 346, 347; 528/308.2

[56] References Cited

U.S. PATENT DOCUMENTS

| | | | |
|---|---|---|---|
| 3,405,098 | 10/1968 | Heighton et al. | 260/75 |
| 3,544,525 | 12/1970 | Balint et al. | 260/75 |
| 4,064,112 | 12/1977 | Rothe et al. | 260/75 M |
| 4,165,420 | 8/1979 | Rinehart | 526/63 |
| 4,254,253 | 3/1981 | Brent, Jr. et al. | 528/272 |
| 4,271,287 | 6/1981 | Shah | 528/272 |
| 4,436,782 | 3/1984 | Ho | 428/402 |
| 4,612,363 | 9/1986 | Sasaki et al. | 528/274 |
| 5,340,509 | 8/1994 | Chang et al. | 264/5 |
| 5,362,844 | 11/1994 | Kerpes et al. | 528/308.5 |

Primary Examiner—Mary Lynn Theisen
Attorney, Agent, or Firm—Chris Konkol; Patricia Kelly

[57] ABSTRACT

The present invention relates to a process for forming robust, uniform, low molecular weight crystalline polyester particles. Such particles are useful for forming higher molecular weight polyesters, for example, by solid-state polymerization. Either conventionally-formed, essentially amorphous, non-molten polyester pellets at ambient temperatures or, alternatively, essentially amorphous molten polyester droplets, can be crystallized by rapidly subjecting the droplets or pellets to a thermal shock according to the process of the present invention.

36 Claims, 7 Drawing Sheets

PROCESS FOR PELLET FORMATION FROM AMORPHOUS POLYESTER

FIELD OF THE INVENTION

This invention relates to a process for forming uniform, crystalline, low molecular weight polyester particles. Such particles are useful as feedstock for the production of high molecular weight polyester.

BACKGROUND

Various methods and apparatus for forming a polymer into particles are known. For example, polymers have been formed into solidified strands, ribbons, or sheets which have then been broken into particles. Fracturing or granulation of a sheet, for example, into particles may be accomplished by various methods including ball milling. Such methods of particle formation, however, may result in particles which are not uniform in size and shape. Furthermore, such methods may generate an undesirable amount of fines, which make particle handling and processing difficult.

It is also known to form polymer particles by first forming polymer drops, from a "melt" of the polymer, and subsequently solidifying the drops into particles or pellets. Pastillation is an example of one such method. For example, Chang et al., U.S. Pat. No. 5,340,509, disclose a process for pelletizing ultra high melt flow crystalline polymers which are polyolefin homopolymers, copolymers, or blends thereof. The process of Chang et al. uses, as a droplet-forming means, a pastillator which comprises an outer container with orifices. The outer container rotates around an inner container to allow a uniform amount of the polymer melt to emerge as droplets. The droplets are collected on a conveyor, which cools the droplets for a time sufficient to solidify the droplets.

In addition to pastillation methods, the formation of polymers into particles via polymer droplets has been accomplished in a variety of other ways. For example, U.S. Pat. No. 4,340,550 to Ho, discloses the preparation of free-flowing pellets of poly(ethylene terephthalate) oligomer by quenching droplets of molten oligomer in water. The molten oligomer is fed to a droplet-forming means having an orifice plate with multiple orifices. Under pressure, molten oligomer flows through the orifices and out into an inert gas. The molten oligomer dissociates into droplets at a distance from the plate under the force of surface tension. The molten droplets are then quenched in a tank of water. The oligomer pellets are slightly flattened, about 0.3 to 2.0 mm thick and about 0.8 to 4.0 mm in circular diameter.

Rinehart, U.S. Pat. No. 4,165,420, discloses forming particles by employing a spray congealer which forms particles from low-viscosity molten polymer. Molten polymer is conveyed to the rotating bowl of a centrifugal atomizing device. This device produces small spherical droplets which congeal, in an inert gas, in the form of spherical beads having an average particle size of 100–250 microns, depending on the speed of rotation of the bowl.

Uniform, crystalline, low molecular weight polyester particles, in size ranges suitable for mass handling (e.g., about 2 mm to 6 mm) are difficult to produce using traditional methods or apparatus for various reasons. A low molecular weight polyester, also referred to as an oligomer or prepolymer, when in a molten state, may have relatively low viscosity. Such low viscosity may cause difficulties in the formation of droplets of uniform shape and size, especially by conventional means because of the resulting low pressures.

Low molecular weight polyester particles, as produced by conventional methods, have the disadvantage that they may not be in a form most conducive to solid-state polymerization (SSP), especially in the absence of a time-consuming annealing step. Solid-state polymerization is used in industry to obtain quality-grade polycondensation polymers of very high molecular weight. Such solid-state polymerization typically involves heating a "prepolymer" which is a medium molecular weight polymer, in the form of chips. This polymer is heated to a temperature above its glass transition temperature ($T_g$) but below its melting point ($T_m$). In comparison, relatively low molecular weight particles, as feedstocks, may be disfavored because of the difficulty in forming such particles and because of the brittle nature of the formed particles.

Since polymerization reaction rates increase with temperature, the optimum temperature for solid-state polymerization is usually as close to the melting point as possible. In order to reduce sticking together at such high temperarture, polyester particles produced by conventional particle formation methods and apparatus typically need conditioning prior to solid state polymerization. Such conditioning may involve annealing at fairly high temperatures (e.g., 150° C. to 210° C. for polyethylene terephthalate) and for long amounts of time (e.g., about 0.5 to 8 hours). Such conditioning increases the crystallinity level of the particles. Typically, the pellets are initially subjected to a certain amount of annealing under high turbulence and agitation in order to achieve uniform annealing without sticking together. If such particles are not properly conditioned prior to solid-state polymerization, processing problems may result. For example, they may tend to stick together during SSP, resulting in an inability to discharge the particles from the SSP reactor, which may even result in a reactor shutdown.

As mentioned above, polyester particles or pellets formed by conventional methods may be unduly non-uniform, malformed and/or characterized by high levels of fines. Such malformed and non-uniform pellets may be undesirable because they may bridge in pellet feed hoppers. Additionally, significant amounts of malformed pellets may alter the bulk density of the pellet feedstock to a polymerization processes, which may result in feeding problems in extrusion lines. It may also result in voids in the final product. Since reaction rate is to some degree dependent on particle size, non-uniform pellets may result in non-uniform molecular weight in the product of polymerization.

In view of the above, there is a need for an improved process of forming polyester particles. In order to be useful as feedstocks for polymerization processes, such particles should preferably have sufficient structural integrity to make them suitable for transport to such processes. The particles should preferably have relatively uniform size and shape in order to facilitate handling and to ensure uniform polymerization within each particle. For improved solid-state polymerization, the particles should preferably be robust enough to withstand high temperatures during solid-state polymerization without agglomerating. It would be even more desirably if the particles could withstand higher temperatures than most typical of solid-state polymerization. It would be desirable if robust or crystalline particles could be obtained more efficiently and readily than presently the norm. Accordingly, it would be advantageous if costly and expensive steps for conditioning polyester particles prior to solid-state or other polymerizations could be reduced or eliminated. It would be desirable if such particles could have a diversity of uses, including, not only serving as a prepolymer or feedstock for solid-state polymerization, but optionally or additionally as feed material for, among examples, injection molding, bottle manufacture, and extrusion processes.

SUMMARY OF THE INVENTION

The present invention is directed to a process for preparing a polyester pellet in crystalline form. The pellets formed by the present invention range in size between about 500 microns and 2 cm in average diameter. The process may be carried out either by crystallizing molten droplets of an amorphous melt or, alternatively, by crystallizing pellets or particles of an amorphous solid. In either case, the process may be described as a thermal shock treatment. A polyester particle is crystallized by subjecting the particle to a rapid change in its environmental temperature so that the particle, or its bulk average temperature, is brought sufficiently rapidly to a temperature within a certain temperature range or zone.

Without wishing to be bound by theory, it is believed that this rapid change in the temperature of the particle allows the particle to undergo crystallization mostly within the desired temperature range, rather than the particle undergoing an undesirable amount and/or kind of crystallization before reaching this temperature range. Preferably, a minimal amount of crystallization takes place before the particle reaches the desired temperature range or zone. This temperature zone extends around what is referred to as the calculated "temperature of the maximum crystallization rate". As mentioned above, the particle may be brought within this temperature range from either an amorphous melt or an amorphous solid or glass, that is from either direction, towards the calculate point of maximum crystallization rate.

The calculated point of maximum crystallization rate (the calculated $T_c$) for polyesters is defined as the mid-point between the glass transition temperature ($T_g$) of the polyester and the melting point ($T_m$) of the polyester. Thus, $T_c$ equals $T_g+0.5(T_m-T_g)$. The same value for $T_c$ can be obtained by the equation $T_c=0.5(T_m+T_g)$. This calculated $T_c$ is a reasonably accurate approximation of an experimentally determined or measured $T_c$ or each polymer. Unless indicated otherwise, $T_c$ herein will refer to the theoretical or calculated $T_c$, as herein defined, rather than to the experimentally measured $T_c$.

With respect to the change affected within the particle, the present invention can be defined as a process for the crystallization of low molecular weight polyester pellets, which process comprises:

(1) heating solid (glassy) pellets of a polyester oligomer, having a degree of polymerization (DP) of 2 to 40 and a glass transition temperature ($T_g$) above 25° C., from an initial temperature $T_0$, wherein $T_0$ is below $T_g+20°$ C., so that the bulk average temperature of the pellets is brought, within 15 seconds, to a temperature within a range extending from $T_{min}$ to $T_{max}$ wherein $T_{min}=T_c-0.5(T_c-T_g)$ and $T_{max}=T_c+0.5(T_m-T_c)$ and, furthermore, upon reaching said temperature, maintaining said pellet within said range for at least 3 seconds; or (2) cooling molten droplets of a polyester oligomer having the DP and $T_g$ as described above, from an initial temperature $T_1$, wherein $T_1$ is at least the melting point $T_m$ of the polyester oligomer, so that the bulk average temperature of the droplets or crystallizing pellets is brought, within 15 seconds, to a temperature within a range extending from $T_{min}$ to $T_{max}$ wherein $T_{min}=T_c-0.5(T_c-T_g)$ and $T_{max}=T_c+0.5(T_m-T_c)$ and, furthermore, upon reaching said temperature, maintaining said pellet within said range for at least 3 seconds.

In the latter definition of the invention, the temperatures $T_{min}$ and $T_{max}$ refer to the temperature of the pellets. The invention might also be defined in terms of the thermal environment to which the pellets are exposed, including process parameters. Accordingly, when forming essentially-crystalline polyester pellets from an essentially-amorphous melt, a process according to the present invention can be defined as comprising the following steps:

(a) forming molten droplets of a polyester oligomer at a temperature $T_1$ wherein $T_1$ is at least the melting point $T_m$ of the polyester oligomer and wherein the polyester oligomer has a degree of polymerization (DP) of 2 to 40 and a glass transition temperature ($T_g$) above 25° C.;

(b) crystallizing said molten droplets by placing the droplets in contact, for at least 3 seconds, with a solid surface which is at a temperature within the range of $T_{min}$ to $T_{max}$ as defined below, whereby the droplets or crystallizing pellets sustain a rapid change in temperature towards said temperature and remain at a temperature within said range for a sufficient period of time;

wherein $T_{min}=T_g+10°$ C., $T_{max}=T_c+0.5(T_m-T_c)$, and $T_c=T_g+0.5(T_m-T_g)$;

except that, if the solid surface has a heat transfer coefficient ($h_s$) which is below 1.5 joules/sec cm$^2$°C., then $T_{min}$ of the solid surface may be between 0° C. and ($T_g+10°$ C.) provided that the change in the bulk average temperature of the pellets remains above $T_{min}$ for at least 3 seconds after the pellets contact the solid surface and provided that the bulk average temperature of the pellets reaches $T_{max}$ within 15 seconds after the pellets contact the solid surface.

Alternatively, as indicated above, essentially-crystalline polyester pellets may be formed by starting with an essentially-amorphous pellet which has been previously made from a polymer melt. In this case, the invention comprises the following steps:

(a) obtaining pellets of an essentially-amorphous, solid polyester oligomer having a degree of polymerization (DP) of 2 to 40 and a glass transition temperature ($T_g$) above 25° C.;

(b) heat treating the pellets, from a temperature $T_0$ by contacting them with a gas a temperature of at least $T_{min}$ at for at least about 0.5 seconds; wherein $T_{min}$ is at least the melting point of the polyester oligomer.

In the present process, the purpose of exposing the pellets to contact with a hot or cold surface is to rapidly bring the pellets to within a certain temperature range for a certain minimum period of time. However, this may be accomplished under a variety of circumstances. For example, in cooling pellets, if the the surface to which the pellets are exposed has a relatively low heat transfer coefficient, it may be necessary, in order that the pellets rapidly reach the desired temperature, for the surface to be significantly cooler than the desired temperature. For example, it may be necessary for the surface to be significantly cooler when the surface is a plastic such as Teflon(™) poly(tetrafluorethylene) than when the surface is steel.

The polyester pellets made by the process of this invention have a variety of uses, but the pellets are especially advantageous for use as a prepolymer feedstock for solid-state polymerization to produce higher molecular weight polyesters. Accordingly, the present process may be especially advantageous as part of an overall process for making a higher molecular weight polyester, for example, by solid-state polymerization. The present invention may be advantageously integrated with an earlier process step for making a polyester oligomer having the specified DP and/or with a later process step for further polymerizing the oligomer which has been formed into pellet according to the present invention.

The invention may be more fully understood by reference to the following detailed description and drawings.

DETAILED DESCRIPTION OF THE INVENTION

Figure 1:
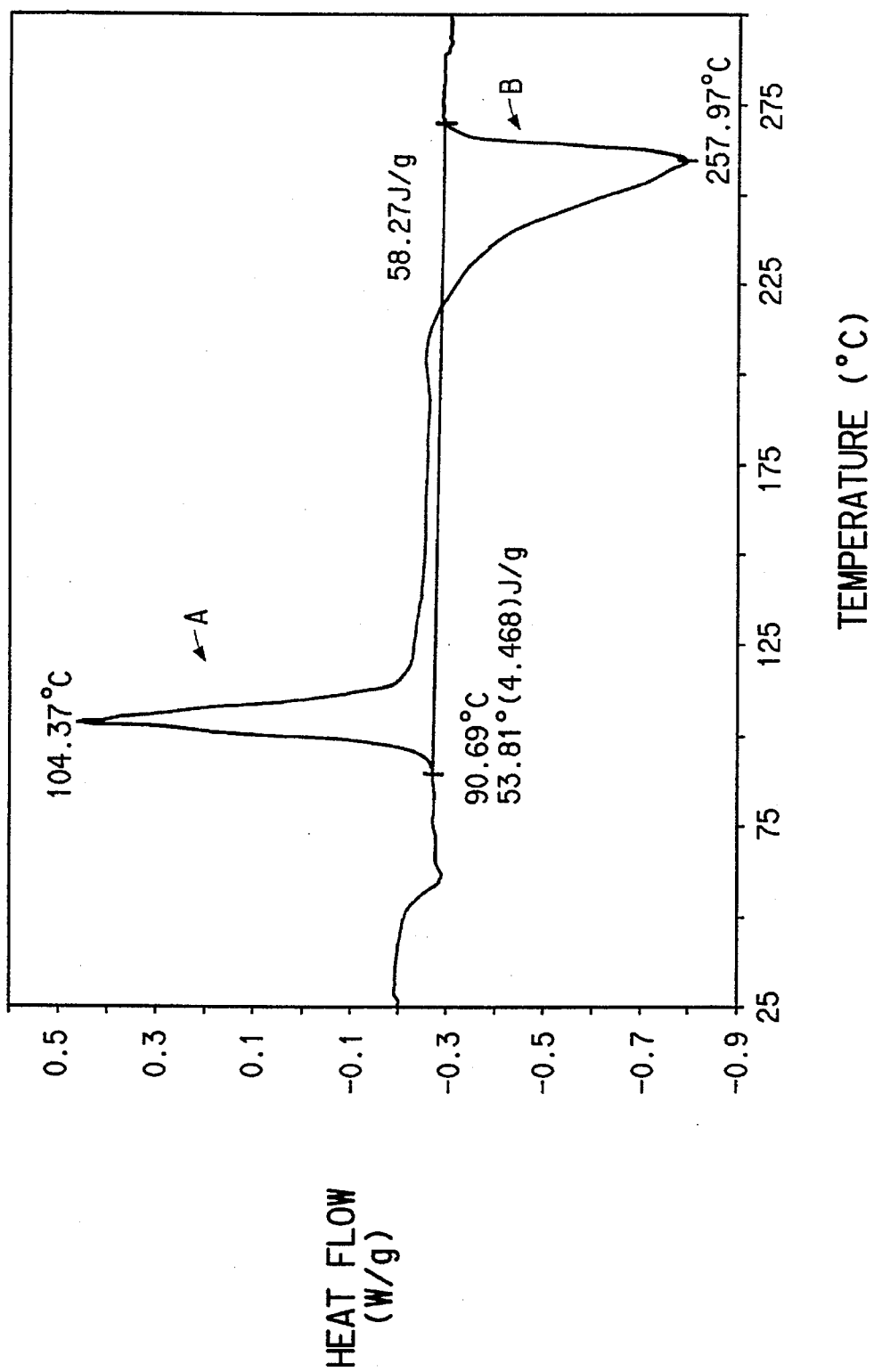
FIG. 1 is a graph of heat flow versus temperature, produced by differential scanning calorimeter (DSC) measurement of a sample of an essentially-amorphous polyethylene terephthalate pellet prior to either conventional annealing or to processing according to the present invention.

This invention is directed to an improved process for producing essentially-crystalline particles of a low molecular weight polyester. In one embodiment of the present invention or process, a polyester oligomer, at or above the polyester melt temperature, is formed into essentially-crystalline pellets. In a second embodiment of the present invention, an essentially-amorphous, non-molten (glassy or solid), low molecular weight polyester pellet, such as made by conventional methods, is formed into essentially-crystalline pellets.

Both embodiments may be characterized as crystallizing the pellets by a "thermal shock" method, although the latter embodiment may involve a greater temperature differential between the pellets and the environment because of slower heat diffusion or conduction.

Whether one begins with conventionally-formed, essentially amorphous, non-molten, polyester pellets at about ambient temperatures, or just-formed, molten, polyester droplets, the crystallization involves subjecting the pellets to a thermal environment such that the pellets rapidly achieve a temperature within the zone or region of the calculated $T_c$, the maximum crystallization rate temperature for the particular polyester being processed. The particles must remain within this zone or region for a sufficient period of time for a sufficient amount of crystallization to occur within that zone. During the imposition of the thermal shock, the pellets are exposed to a temperature ranging from about $T_{max}$ to $T_{min}$ for at least a period of about 3 seconds.

As a result, the crystalline structure of the pellets can quickly reach the desired degree of crystallinity and, in some cases, achieve a superior or even, in some cases, unique crystalline morphology. Another possible advantage of crystallizing in this manner is that the thus-obtained polyester pellets or particles can more readily be solid-state polymerized, potentially avoiding conditioning steps presently thought necessary, as with conventionally produced polyester particles which require hours of processing time to achieve the necessary state of crystallization for solid-state polymerization. The use of the present process for producing polyester pellets for solid-state polymerization offers significants advantages in terms of economies of time and money, in addition to any improvement in quality.

By the term "pellet" herein is meant any discrete unit or mass of a given material, having any shape or configuration, irregular or regular, within a wide range of sizes. Although the term "pellet" might elsewhere have a narrower connotation, the term "pellet" is employed herein to include particles and pellets in the broadest sense of the word. Preferred forms and/or sizes for particles are spherical particles with diameters of 0.05 mm to 0.3 mm, hemispherical particles with a maximum cross section of 0.1 mm to 0.6 mm, or right circular cylinders with a diameter of 0.05 mm to 0.3 mm and a length of 0.1 cm to 0.6 cm. Since, preferably, the pellets are produced on the most economically efficient, the pellets would preferably be produced and collected together in commercial quantities of greater than 10 kg, more preferably greater than 30 kg. The pellets may be used in the same plant soon after being made, stored for later use, or packaged for transport, all in commercial quantities.

By the term "polymer" is meant a compound or mixture of compounds consisting essentially of or comprising at least 90 percent, preferably at least 95 percent, and most preferably at least 99 percent by weight of repeating structural units called monomers. The term polymer is meant to include prepolymer or oligomer, that is, a polymer having a degree of polymerization (DP) of at least 2 or 3. By "low molecular weight polymer" is meant a polymer having a degree of polymerization in the range of about 2 to about 40, preferably 5 to 35. By "molten polymer" is meant a polymer at a temperature at or above its melt temperature; likewise by "molten droplet" is meant any discrete unit, or portion, of a melt which is a polymer-pellet precursor, whether actually dropped or not, which is at a temperature at or above the melting point of the polymer. By pellet "diameter" is meant the largest cross-sectional dimension of a given pellet. By pellet "average diameter" or "average size" is meant the average largest cross-sectional dimension of a representative sample of the pellets being processed according to the present invention.

The melting point, $T_m$, of a polymer is preferably determined as the maximum of the melting endotherm on the first heat, measured by Differential Scanning Calorimetry (DSC). By a premelting endotherm is meant an endothermic peak in the DSC due to a melting endotherm at a lower temperature than (before)the "main" melting endotherm. By a "distinct premelting endotherm" is meant the melting occurs over a temperature range of 60° C. or less, preferably less than 40° C. By having "no" premelting endotherm is meant that if one or more such endotherms are detected, the total heat of fusion is less than 1 J/g, preferably less than 0.5 J/g.

By "crystallization exotherm" is meant an exothermic peak in the DSC due to an amorphous region undergoing crystallization prior to melting of the polymer.

By "glass transition temperature," $T_g$, is meant the meant the inflection point of the step transition associated with the glass transition on a DSC trace heated at about 10° C./min. An example of this is illustrated in FIG. 1, showing the inflection point of the glass transition occurring at about 58° C.

By "bulk average temperature" of a pellet is meant the average temperature of the mass of the pellet or the average of the temperature in every location of the particle.

By the term "heat transfer coefficient" or "h" with respect to a solid surface or gas, to which a pellet is exposed, is meant k/b, where k is the thermal conductivity of the solid surface or gas and b is the thickness. Values for k can be found, for example, in R.H. Perry et al., *Chemical Engineers' Handbook*, chapters 10—10 and 23 (McGraw-Hill Book Co. 4th edition) and R. L. Earl, *Unit Operations in Food Processing* (Pergamon Press, Oxford 1966). For example, the heat transfer coefficient "h" for a 1 mm thick steel belt is, for example, may be about 1.5 joules/sec cm$^2$°C. (or 2800 BTU/hr ft$^2$°F.). However, the heat transfer coefficient can vary among different steels. The heat transfer coefficient of natural-convection nitrogen (as, for example, in a batch oven) may be, for example, about 0.0005 to 0.002 joules/sec cm$^2$ °C. (or 1 to 4 BTU/hr ft$^2$°F.), forced convection nitrogen (as, for example, when a pellet falls under force through a nitrogen column) may be, for example, 0.0025 to 0.05 joules/sec cm$^2$°C. (or 5 to 100 BTU/hr ft$^2$°F.). The heat transfer coefficient of a 1 mm Teflon(™) belt may be, for example, about 0.025 joules/sec cm$^2$°C. (or 45 BTU/hr ft$^2$°F.). Generally, metals tend to have a "h" ranging from about 0.10 to 40 joules/sec cm$^2$°C. (or 175 to 67,000 BTU/hr ft$^2$°F.)

By the term "measured" or "actual" maximum crystallization rate temperature (measured or actual $T_c$) is meant the experimentally determined definition known in the art. Experimentally determined $T_c$ values may be found in the literature for a wide range of polyesters. For example, the actual maximum crystallization rate can be found experimentally as described in F. Van Antwerpen et al., *J. Polym. Sci., Polym. Phys. Ed.*, vol. 10, p. 2423–2435 (1972); M. R. Tant et al., *Polym. Eng. and Science*, vol. 33, no. 17, p. 1152–1156 (1993); R. J. Phillips et al., *Macromolecules*, vol. 22, no. 4, p 1649–1655 (1989); S. Buchner et al., *Polymer*, vol. 30, p. 480–488 (1989). As indicated earlier, the calculated $T_c$ is, for the purposes of this invention, a reasonably accurate approximation of the actual $T_c$ for polyesters is. The calculated $T_c$ is defined herein as $T_c=(T_g+T_m)/2$ or $T_c=T_g+(½)(T_m-T_g)$.

Polyesters are polymers generally comprised of one or more diacid or diester components and one or more diol components. Many polyesters can be formed into pellets by the process of this invention. The process of this invention is useful for most aromatic or aliphatic-ring-containing (for example, phenyl or cyclohexyl-containing) polyesters that do not readily crystallize at room temperature. This would include, for example, poly(ethylene terephthalate) (PET), poly(ethylene napthalate) (PEN), poly(butylene naphthalate) (PBN), poly (trimethylene terephthalate) (3G-T), and poly(trimethylene naphthalate) (3G-N), poly(cyclohexyl terephthalate) (PCT), and the like. Generally, polyesters having a glass transition temperature, $T_g$, above about 25° C., and a melt temperature, $T_m$, ranging from about 200 to about 320° C. are best suited to the process of this invention.

The approximate $T_g$ and $T_m$ values for some useful polyesters are listed below in degrees Celsius.

|      | $T_g$ | $T_m$ |
| ---- | --- | ----- |
| PET  | 70  | 260   |
| PEN  | 120 | 270   |
| PBN  | 82  | 242   |
| 3G-T | 35  | 227   |

The values for $T_g$, $T_c$, and $T_m$ can vary somewhat, for example, with a polymer's morphology, thermal history, molecular weight, and crystallinity. For example, a low DP PET (a DP of 10 to 20) typically has a $T_m$ of about 250° C., a $T_g$ of about 60° C., and a $T_c$ of about 155° C.

Suitable diacid or diester components for the polyesters to which this invention pertains normally include alkyl dicarboxylic acids having 4 to 36 carbon atoms, diesters of alkyl dicarboxylic acids having 6 to 38 carbon atoms, aryl dicarboxylic acids which contain frown 8 to 20 carbon atoms, diesters of aryl dicarboxylic acids which contain from 10 to 22 carbon atoms, alkyl sustituted aryl dicarboxylic acids which contain from 9 to 22 carbon atoms, or diesters of alkyl substituted aryl dicarboxylic acids which contain from 11 to 22 carbon atoms. Preferred alkyl dicarboxylic acids contain from 4 to 12 carbon atoms. Some representative examples of such alkyl dicarboxylic acids include glutaric acid, adipic acid, pimelic acid and the like. Preferred diesters of alkyl dicarboxylic acids contain from 6 to 12 carbon atoms. A representative example of such a diester of an alkyl dicarboxylic acid is azelaic acid. Preferred aryl dicarboxylic acids contain from 8 to 16 carbon atoms. Some representative examples of aryl dicarboxylic acids are terephthalic acid, isophthalic acid and orthophthalic acid. Preferred diesters of aryl dicarboxylic acids contain from 10 to 18 carbon atoms. Some representative examples of diesters of aryl dicarboxylic acids include diethyl terephthalate, diethyl isophthalate, diethyl or orthophthalate, dimethyl naphthalate, diethyl naphthalate and the like. Preferred alkyl substituted aryl dicarboxylic acids contain from 9 to 16 carbon atoms and preferred diesters of alkyl substituted aryl dicarboxylic acids contain from 11 to 15 carbon atoms.

The diol component for polyesters used in the invention suitably include glycols containing from 2 to 12 carbons atoms, glycol ethers containing from 4 to 12 carbon atoms and polyether glycols having the structural formula HO—(AO)$_n$H, wherein A is an alkylene group containing from 2 to 6 carbon atoms and wherein n is an integer from 2 to 400. Generally, such polyether glycols will have a molecular weight of about 400 to 4000.

Preferred glycols normally contain from 2 to 8 carbon atoms with preferred glycol ethers containing from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, and the like.

The polyesters or oligomers of the present invention may be branched or unbranched, and may be homopolymers or copolymers.

Particularly useful are "modified polyesters" which are defined as being modified with up to 10% by weight of a comonomer. Unless indicated otherwise, by the term polyester is meant modified or unmodified polyester. Similarly, by the mention of a particular polyester, for example PET, is meant unmodified or modified PET. Comonomers can include diethylene glycol (DEG), triethylene glycol, 1,4-cyclohexane dimethanol, isophthalic acid (IPA), 2,6-naphthalene dicarboxylic acid, adipic acid and mixtures thereof. Preferred comonomers for poly(ethylene terephthalate) include 0–5% by weight IPA and 0–3% by weight DEG.

In a more backward integrated embodiment of this invention, the polyester prepolymer or oligomer making up the pellets obtained by the present invention can optionally be polymerized from monomers, oligomers, or mixtures thereof. This optional polymerization step may be accomplished using known methods and apparatus, as will be readily appreciated by the skilled artisan. Polymerization of polyesters is well known in the art. Polyesters are often formed as a melt by combining a diacid or diester with a diol to produce a monomer, and heating to polymerize the monomer. A preferred method of polymerization to low molecular weight polyester is carried out in a pipeline reactor. For details, see copending, commonly assigned, concurrently filed application Ser. No. 08/376,596, incorporated by reference herein.

Polymerization is conducted to reach a desired degree of polymerization. Generally, the polyester used to make pellets according to this invention has a degree of polymerization ranging from about 2 to about 40. By degree of polymerization (DP) is meant the average number of repeat units in a polymer chain and therefore may not necessarily be an integer. For example, the repeat unit of poly(ethylene terephthalate) (PET) is

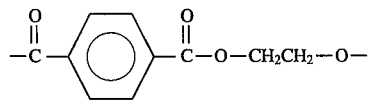

The DP of a polymer can be determined by Gel Permeation Chromatography using appropriate standards. The preferred degree of polymerization for this invention is influenced by the pellet-forming means that is chosen and the anticipated use of the final pellets. Generally, a DP of about 5 to 35 is preferred for PET when the pellet formation means is a pastillator, discussed below.

The degree of polymerization is merely one way of expressing the molecular weight of a polyester. Another measure of the molecular weight is the intrinsic viscosity (IV) of the polymer. For example, a poly(ethylene terephthalate) polymer having a DP of 2 to 40 should have an IV which ranges from about 0.05 to about 0.4 dl/g when tested with a solution of one part volume of trifluoroacetic acid and three parts volume of methylene chloride.

An IV may be determined according to the following example: 0.050 g of a polyester such as, for example, PET is weighed into a clean dry vial and 10 ml of solvent is added using a volumetric pipette. The vial is closed (to prevent evaporation of the solvent) and shaken for 30 min or until the PET is dissolved. The solution is poured into the large tube of a #50 Cannon-Fenske viscometer, which is then placed in a 25° C. water bath and allowed to equilibrate to that temperature. The drop times between the upper and lower marks are then measured in triplicate, and should agree within 0.4 seconds. A similar measurement is made in the viscometer for the solvent alone. The IV is then calculated by the equation: IV =ln[(solution time/solvent time)/0.5].

In one embodiment of this invention, a polyester polymer at or above its melting temperature is formed into pellets. Pellet formation can be conducted by adapting various methods and apparatus known in the art for pellet formation. This can include dripping (see Example 2), extruding (see Example 3), pastillating (see copending, commonly assigned, concurrently filed application Ser. No. 08/376,599, prilling (See for example, U.S. Pat. No. 4,340,550 to Ho), spray atomization (see, e.g., Rinehart's U.S. Pat. No. 4,165,420), and melt-cutting, among others. A prilling/degassing device for polymers is available from Southwest Research Institute (Dalls, Tex.). Any method is suitable so long as the polyester polymer can be formed into discrete portions at a temperature at or above its melt temperature, i.e. in the molten state. For polyesters, the melt temperature usually ranges from about 200° C. to 300° C., with lower DP polymers tending to have lower melt temperatures. For PET, for example, the melt temperature would usually be equal to or greater than about 250° C.

Pastillation, broadly termed, is employed for particle formation in a preferred embodiment of the present invention. Pastillation typically employs an outer, rotating, cylindrical container having a plurality of orifices circumferentially spaced on its periphery. Within the outer container is an inner, coaxial, cylindrical container having a metering bar or channel. The plurality of orifices on the outer container are disposed such that they will cyclicly align with the metering bar or channel on the inner container when the outer container is rotated.

Typically, molten polyester is transferred to the inner container of the pastillator and, under pressure, is dispensed in uniform amounts, forming droplets or unsolidified pellets, as each of the plurality of orifices on the outer container align with the metering bar on the inner container. Pastillators are commercially available, e.g., the ROTOFORMER® pastillator manufactured by Sandvik Process Systems (Totowa, N.J.). For more details on forming polyester particles by pastillation, see copending, commonly assigned and concurrently filed application Ser. No. 08/376,599, incorporated by reference herein.

Preferably, the molten polyester transferred to the pastillator or other pellet-forming means be essentially amorphous. By essentially amorphous is meant essentially non-crystalline, that is having less than about ten percent (10%), preferably less than five percent (5%), and most preferably less than one percent (1%) crystalline content as defined by a DSC curve in which the difference in the heat of fusion of the crystallization exotherm and the heat of fusion of the main-melting endotherm is less than about 14 J/g, preferably less than 7 J/g, most preferably less than about 2 J/g. This is demonstrated in FIG. 1 which shows a typical DSC curve for an amorphous polyester, in which the heat of fusion of the crystallization exotherm (indicated by A) approximately equals the heat of fusion of the main-melting endotherm (indicated by B ), the difference between the two heats of fusion being less than about 4 J/g. Density may also characterize the crystallinity of various polyesters. For example, an essentially-amorphous polyethylene terephthalate may, for example, be characterized by a density less than about 1.34 g/ml. Essentially-amorphous polyester pellets are made in many commercial processes by rapidly quenching molten polyester particles after formation, which quenching typically inhibits crystallization.

In contrast, essentially-crystalline polyester is herein defined to have a crystallinity content greater than about 15%, preferably greater than 20%, and most preferably greater than 30%, corresponding, respectively, for PET, for example, to a density greater than about 1.36 g/cc, preferably greater than 1.37 g/cc, most preferably greater than 1.39 g/ml. Thus, the term essentially-crystalline or crystalline, as used herein shall include what is commonly referred to as "semi-crystalline," as are most polyesters of interest. The amount of crystallinity can be determined by DSC. For example, essentially-crystalline PET is characterized by a total heat of fusion, expressed in J/g, of at least about 20, more preferably about 35, when 140 J/g is used as the total heat of fusion of pure crystalline PET. Higher heats of fusion indicate more crystalline polymer. The percent crystallinity within a sample of a polyester material or pellet can be determined by comparing the heat of fusion (J/g) of the crystallites present with the heat of fusion of the "pure" crystalline polyester.

After droplet or "molten pellet" formation, the just-formed droplets are then crystallized. The step of crystallizing the pellets is critical to the formation of robust, uniform, low molecular weight pellets suitable for a variety or uses including solid state polymerization.

This crystallization involves temperature manipulations within time limitations. Immediately after polyester droplets are formed at the melt temperature, the droplets are rapidly subjected to a thermal shock. Subjecting the just-formed polymer droplets to a temperature within a preselected or desired thermal range results in an immediate temperature gradient between the crystallizing droplet or pellet, initially at or near its melt temperature, and its surroundings. This should be done quickly, as taught herein, in order to efficiently and/or optimally obtain the desired crystalline morphology. Of course, a temperature gradient also inherently occurs to some extent, depending on the circumstances, within the crystallizing droplet or pellet as its bulk average temperature changes.

The thermal shock is generally achieved through radiant, conductive and/or convective heat. Preferably heating is through the use, or primarily through the use of, conductive or radiant heat, preferably radiant heat below 15 megaherz.

The thermal shock is imposed, in general, in order to ensure that the pellets rapidly achieve a temperature in the temperature range as described above. Without wishing to be bound by theory, it is believed that this rapid change in the temperature of the particle allows the particle to undergo a desired crystallization within the desired temperature range, rather than the particle undergoing an undesirable amount and/or kind of crystallization before reaching this temperature range. This temperature zone extends around what is referred to as the calculated temperature of the maximum crystallization rate.

When forming an essentially-crystalline polyester pellet from an essentially-amorphous melt, the process comprises forming molten droplets of a polyester oligomer at a temperature $T_1$ wherein $T_1$ is at least the melting point $T_m$ of the polyester oligomer and wherein the polyester oligomer has a degree of polymerization (DP) of 2 to 40 and a glass transition temperature ($T_g$) above 25° C. Preferably $T_1$ is between $T_m$ and $T_m+30°$ C., most preferably between $T_m$ and $T_m+10°$ C. The molten droplets are then crystallized by placing them in contact, for at least 3 seconds, with a solid surface which is at a temperature within the range of $T_{min}$ to $T_{max}$ as defined below, whereby the particles sustain a rapid change in temperature towards said temperature and remain at a temperature within said range for a sufficient period of time. Preferably, the solid surface is metallic, since metals will bring the pellets to the desired temperature most readily.

In the present invention, the $T_{min}=T_g+10°$ C. and $T_{max}=T_c+0.5(T_m-T_c)$, wherein $T_c$ is defined as $T_c=T_g+(\frac{1}{2})(T_m-T_g)$ or, equivalently, $(\frac{1}{2})(T_m+T_g)$. However, if the solid surface has a heat transfer coefficient ($h_s$) which is below 1.5 joules/sec cm °C., then $T_{min}$ may be between 0° C. and ($T_g+10°$ C.), provided that the bulk average temperature of the pellets remains above $T_{min}$ for at least 3 seconds after the pellets contact the solid surface and provided that the bulk average temperature of the pellets reaches $T_{max}$ within 15 seconds after the pellets contact the solid surface. The exception for solid surfaces with relatively low heat transfer coefficients, below 1.5 joules/sec cm °C., is most typically applicable to non-metallic surfaces.

Preferably $T_{max}=T_c+0.3(T_m-T_c)$ and most preferably $T_{max}$ is about $T_c+10°$ C. Preferably, at least for metallic surfaces such as steel or aluminum, $T_{min}=T_c-0.5(T_c-T_g)$, and more preferably $T_{min}=T_c-0.3(T_c-T_g)$, most preferably about $T_c-10°$ C.

In order to obtain rapid heat transfer from a surface to the just-formed molten droplets, it is preferred that the surface have a relatively high overall heat capacity. Metals are particularly useful for this purpose, especially metals with high coefficients of heat transfer. Thus, metals are the preferred materials for the surface, which surface is preferably moving in a continuous process, as can be obtained with a conveyor belt.

Preferably, the pellets are exposed to said solid surface in the indicated temperature range for at least 3 seconds, more preferably at least 10 seconds, most preferably at least 20 seconds. The maximum time during which the pellets are exposed to the solid surface in the indicated temperature range is preferably 30 minutes, more preferably 10 minutes, and most preferably 3 minutes. Longer times are not detrimental, but may not be most economical. For example, in an integrated SSP plant for making high molecular weight PET, the pellets after being formed may be introduced into the SSP reactor within 10 minutes after the pellets are formed. It is also possible to store the pellets for later use.

For example, when making pellets of PET according to the present invention, an essentially-crystalline PET pellet may be formed from an essentially-amorphous melt of a PET oligomer at a temperature $T_1$ wherein $T_1$ is at least 250° C., preferably between 260° C. and 280° C., most preferably between 265° C. and 275° C. The molten droplets are then crystallized by placing them in contact, for at least 3 seconds, with a solid surface which is at a temperature within the range of $T_{min}$ to $T_{max}$ wherein $T_{min}$ is preferably 80° C., more preferably 130° C., most preferably 150° C., except if the solid surface is non-metallic and has a heat transfer coefficient ($h_s$) which is below 1.5 joules/sec cm$^2$°C., in which event $T_{min}$ may be between 0° C. and 80° C., depending on the process variables. Preferably, $T_{max}$ is 220° C., more preferably 200° C., and most preferably 180° C.

Alternatively, as indicated earlier, an essentially-crystalline polyester particle may be formed by starting with an essentially-amorphous solid particle or pellet which has been previously made from a polymer melt. (By the term "solid" is meant a polymer glass or solid which is below its glass transition temperature.) In this case, the invention comprises obtaining pellets of an essentially-amorphous, solid polyester oligomer at a temperature $T_0$ wherein the polyester oligomer has a degree of polymerization (DP) of 2 to 40 and a glass transition temperature ($T_g$) above 25° C. and, subsequently, heat treating the pellets by contacting them with a gas at a temperature of at least $T_{min}$ for at least about 0.5 seconds wherein $T_{min}$ is at least the melting point of the polyester oligomer.

Preferred gases, for transfering heat include gases such as air, oxygen, carbon dioxide, nitrogen, argon, helium, and the like, etc. and mixtures thereof. Typically, pellets may be exposed to radiant heat and heated gases in an oven, whether in a stationary (batch) system or in a continuous system, for example, as when a conveyor belt carrying pellets are passed through an oven. Alternatively, the pellets may be dropped through a tower, for example, with a hot gas rising countercurrently. The pellets may be suitably dropped on a heated or unheated surface after falling. Letting the pellets falling into a liquid is less desirable, since liquid separation is then required.

When heating the pellets, $T_{min}$ is preferably between 270° C. and 2000° C., more preferably between 300° and 1500° C., and most preferably between 400° and 1000° C. Preferably, the time of exposure to the indicated temperature is between about 0.5 sec and 2 min, more preferably between 1 and 60 sec, depending on the temperature and the means of heating. For example, heating by dropping the pellets in a tower would preferably take place near the lower ends of the time ranges, compared to when heating the pellets in an oven. The upper time limit may be especially preferred, or even necessary, when employing a hot gas which might otherwise melt the pellet if exposed too long.

For example, when making pellets of PET according to the present invention, an essentially-crystalline PET pellet may be formed from an essentially-amorphous; solid pellet initially at a temperature below 90° C., preferably at least ambient, and most preferably below 70° C. The essentially-amorphous pellets may be crystallized by placing them in contact, for at least 3 seconds, in an oven at a temperature within of at least 250° C., preferably between 270° C. and 1200° C., most preferably between 300° and 800° C.

In more basic terms, with respect to the change affected within the particle, the present invention can also be defined as a process for the crystallization of a low molecular weight polyester particle, comprising heating a solid (glassy) polyester oligomer pellet, having the DP and $T_g$ described above, from the $T_0$ defined above, so that the bulk average temperature of the pellet is brought, within 15 seconds, to a temperature within a range extending from $T_{min}$ to $T_{max}$ wherein $T_{min}=T_c-0.5(T_c-T_g)$, $T_{max}=T_c+0.5(T_m-T_c)$, and $T_c=(½)(T_m+T_g)$, and, furthermore, upon reaching said temperature, maintaining said pellet within said range for at least 3 seconds. Preferably, $T_{min}=T_c-0.3(T_c-T_g)$ and $T_{max}=T_c+0.3(T_m-T_c)$. Most preferably, $T_{min}=T_c-30°$ C. and $T_{max}=T_c+30°$ C.

Alternatively, a molten polyester oligomer droplet can be cooled from the $T_0$ defined above, so that the bulk average temperature of the pellet is brought, within 15 seconds, to a temperature within a range extending from $T_{min}$ to $T_{max}$ wherein $T_{min}=T_c-0.5(T_c-T_g)$, $T_{max}=T_c+0.5(T_m-T_c)$, and $T_c=(½)(T_m+T_g)$ and, furthermore, upon reaching said temperature, maintaining said pellet within said range for at least 3 seconds. Preferably, $T_{min}=T_c-0.3(T_c-T_g)$ and $T_{max}=T_c+0.3(T_m-T_c)$. Most preferably, $T_{min}=T_c-30°$ C. and $T_{max}=T_c30°$ C. Thus, conceptually, whether cooling or heating the pellet, the thermal shock is analogous or similar, except the temperature shock or change is negative when cooling and positive when heating.

The process parameters may vary, not only on the particular method and apparatus used, but may depend on the pellet size, pellet geometry, molecular weight, the heat transfer coefficient of the surface or gas with which the pellets are contacted, and the area of heat transfer.

In the present process, the thermal shock may be accomplished under a wide variety of circumstances and under a wide range of process limitations. For example, in cooling a melt, if the surface to which the pellets are exposed has a relatively low heat transfer coefficient, it may be necessary, in order that the pellets rapidly reach the desired temperature, for the surface to be significantly cooler than the desired temperature. For example, it may be necessary for the surface to be significantly cooler when the surface is a plastic such as Teflon(™) poly(tetrafluorethylene) than when the surface is steel.

The surface of molten polyester may be exposed to a combination of heat transfer materials, for example, a part of the surface may be exposed to a metal surface and another part of the surface may be exposed to, for example, a gas. Similarly, when heating pellets, part of the surface may be exposed to a metal surface, for example in an oven. Liquids at the appropriate temperature may also be used, but they may be less preferred because of concerns that contamination may occur and because of the need to separate the liquid from the polyester.

To determine the bulk average temperature of pellets, the measurement of bulk average temperature can proceed as follows. Quickly collect a sample of the pellets from the solid surface or gas, whichever is used to thermally shock the pellets. Immediately place the pellets in an insulated container, preferably evacuated. Preferably, the pellets nearly fill the container. Insert a thermocouple. Allow the container to come to an equilibrium temperature and record it as the bulk average temperature.

Alternately, a bulk average temperature of pellets being processed can be obtained as follows. Collect a sample of the pellets. Immediately place the pellets in a preweighed amount of distilled water, at a known temperature, in a preweighed insulated container. Reweigh the total mass. Observe the equilibrium temperature. Calculate the bulk average temperature of the pellets based on the following equation:

$$(m_w)X(c_{pw})X(T_e-T_w)=(m_p)X(c_{pp})X(T_p-T_e)$$

wherein $m_w$ is the mass of the water, $c_{pw}$ is the heat capacity of the water, $m_p$ is the mass of the pellets, $c_{pp}$ is the heat capacity of the pellets, $T_e$ is the equilibrium temperature, and $T_w$ is the initial temperature of the water, and X represents multiplication. This equation can be solved to determine $T_p$, the bulk temperature of the pellets.

As will be appreciated by one of ordinary skill in the art, the bulk average temperature of the pellets, under various conditions, can be estimated with a reasonable degree of accuracy and precision based on standard heat transfer equations. The skilled artisan will be familiar with such calculations, including numerical and/or computer techniques for improved efficiency and accuracy.

For example, if one knows the heat transfer coefficient of the environment and the process conditions then an estimate of the change in bulk average temperature of the particle with time can be obtained from the equation:

$$Q = m_p c_p \frac{dT_p}{dt} = hA(T_e - T_p)$$

$$\frac{dT_p}{dt} = \frac{hA}{m_p c_p}(T_e - T_p)$$

$$\frac{dT_p}{dt} = kT_e - kT_p$$

where $k = \frac{hA}{m_p c_p}$ $$\int_{T_{p0}}^{T_p} \frac{dT_p}{T_e - T_p} = \int_0^t k\,dt$$

$$-\text{Ln}\left(\frac{T_e - T_p}{T_e - T_{p0}}\right) = kt$$

$$T_e - T_p = (T_e - T_{p0})(e^{-kt})$$

$$T_p = T_{p0}(e^{-kt}) + T_e(1 - e^{-kt})$$

This equation indicates that if the heat transfer constant, k, is known for a given system as well as the initial temperature of the particle and the temperature of the environment, then the bulk average temperature of the particle as a function of time can be calculated wherein $m_p$ is the mass of the pellet, $c_p$ is the heat capacity of the pellet, t is time, h is the heat transfer coefficient of the surface or gas to which the pellet is subjected, $T_e$ is the temperature of the surface or gas to which the pellet is subjected, and A is the area which is contacted or subjected to the heat source, whether a solid surface or a gas. For example, a hemispherical particle dropped on a steel belt may have a flat area A in touch with the belt, which area can be readily estimated as $(\pi)(\text{radius}/2)^2$. Alternatively, an average value A of a sample of pellets can be physically measured for use in the above equations. These equations can be solved for T, the bulk average temperature of the pellet.

As mentioned above, the thermal shock can be imposed so that the temperature gradient experienced by the pellets occurs in either direction, that is as a result of either heating or cooling. However, it is preferable that the pellets be crystallized by cooling from the melt. This avoids the need to reheat cooled particles and is thus more energy efficient.

The rapid crystallization may have the further advantage of leading to the formation of crystals that are larger than those formed by conventional processes. See, for example, concurrently filed copending application Ser. No. 08/376, 600, herein incorporated by reference in its entirety. While this invention is not bound by any particular theory or explanation, it is believed that crystallization carried out per the process of this invention is capable of providing rates of crystal nucleation and crystal growth that promote and enhance formation of larger crystals. Such pellets with larger crystals have surprisingly been found to better withstand, without sticking or agglomerating, the high temperatures associated with most SSP processes or even to allow higher SSP temperatures than before, a significant advantage, since SSP temperatures are a bottleneck, in terms of time, compared to other polymerization processes. Without wishing to be bound by theory the crystallization of the outer layer of the pellet, nearer the surface, may have more effect on the desirable characteristics of the pellets.

Similarly, the present process is also capable of forming pellets of PET, for example, which do not exhibit a distinct pre-melting endotherm when tested on a DSC. Premelting endotherms are believed to be indicative of small and/or relatively imperfect crystallites. When premelting endotherms are present, the PET pellet will tend to more readily stick to other pellets when heated, usually at a temperature near the premelting endotherm, a very undesirable tendency in solid-state polymerization, as discussed further below.

Figure 2:
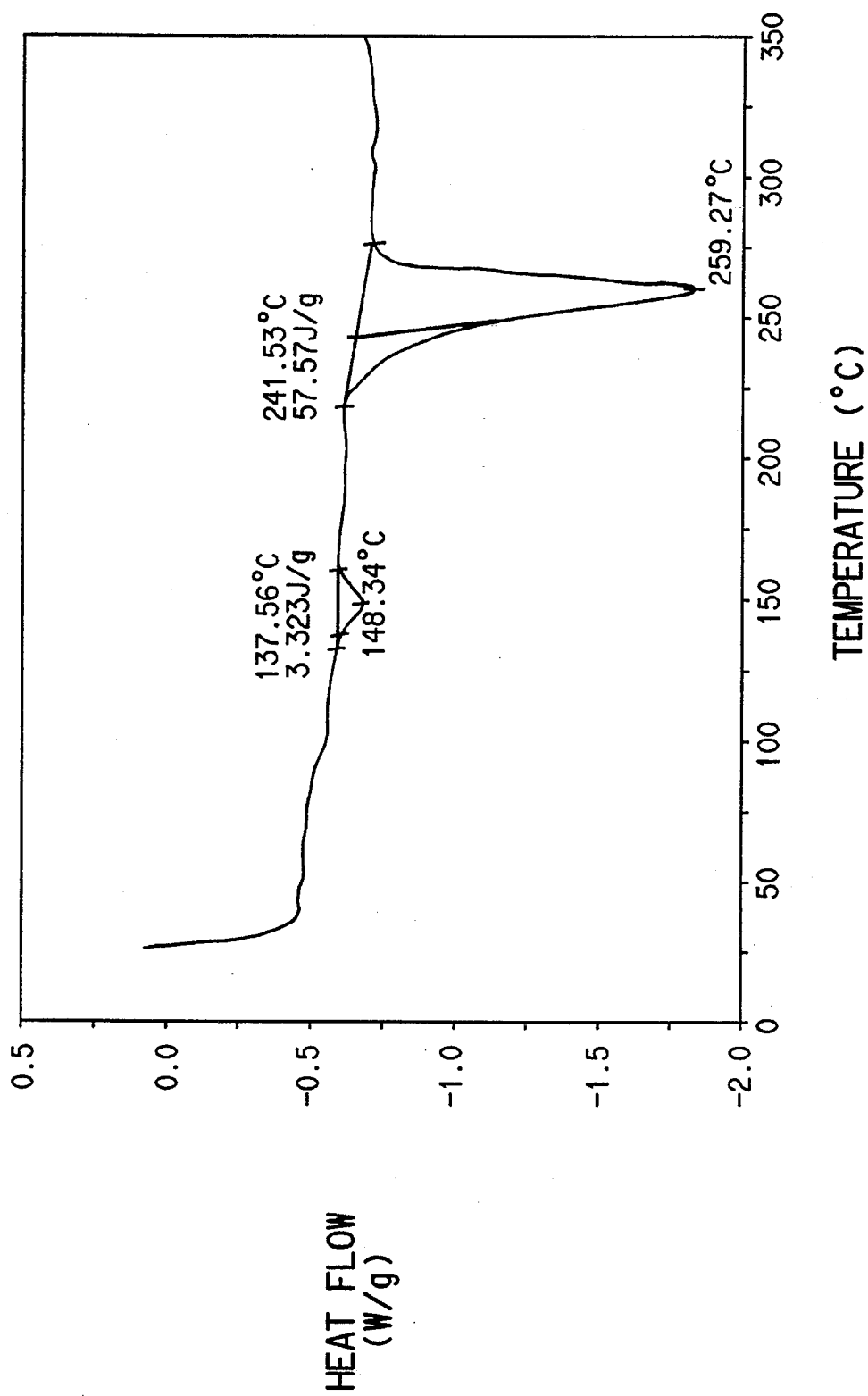
FIG. 2 is a graph of heat flow versus temperature, produced by a differential scanning calorimeter measurement of a sample of conventional low molecular weight, polyethylene terephthalate pellet annealed at 200° C. for 1 hour, which graph shows a premelting endotherm.
Figure 3:
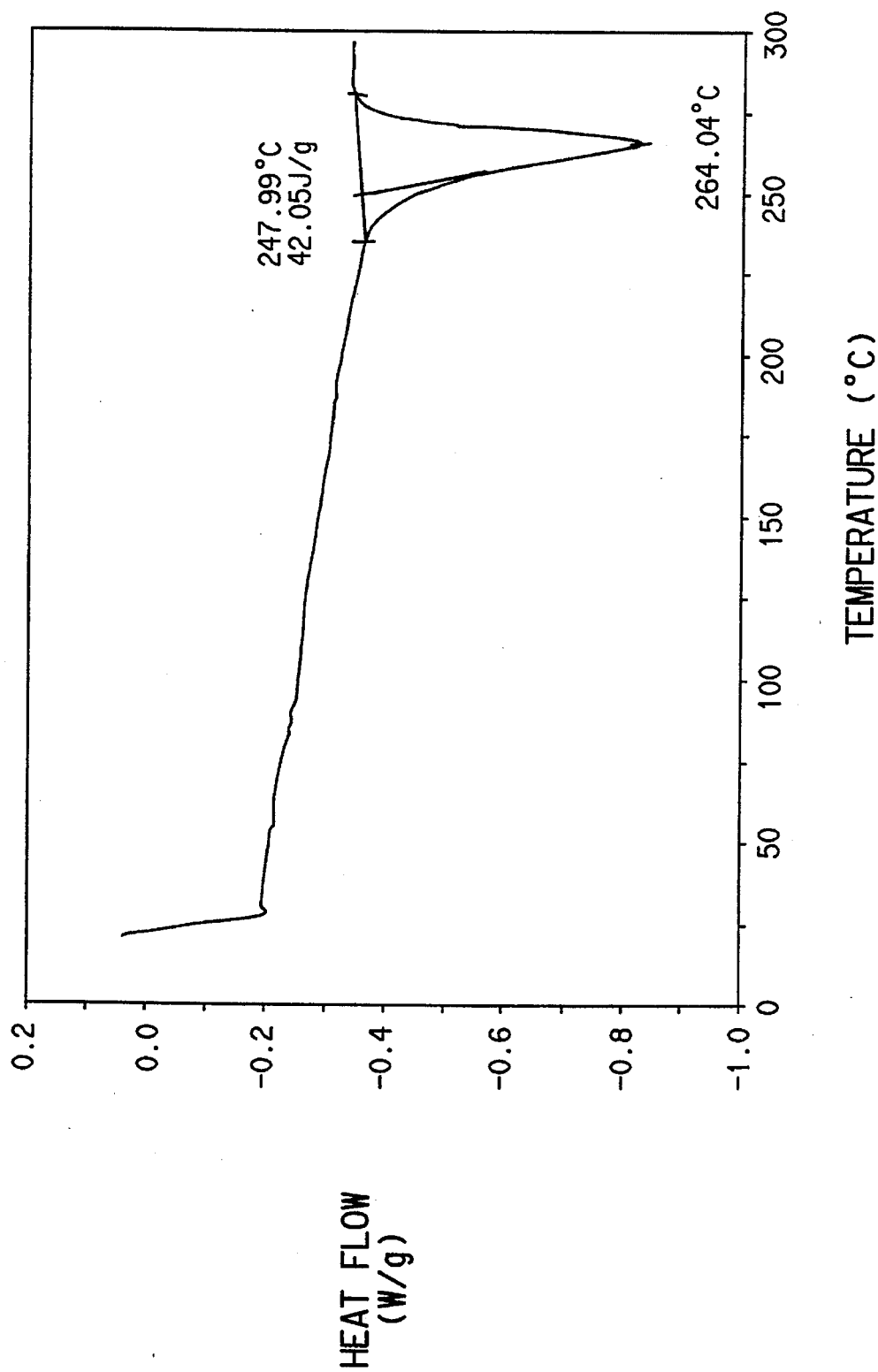
FIG. 3 is a graph of heat flow versus temperature, produced by a differential scanning calorimeter measurement of a sample of a low molecular weight poly(ethylene terephthalate)pellet made by the process of this invention by thermal shock crystallization of essentially-amorphous PET pellets at 550° C. for 25 seconds, which graph does not show a distinct pre-melting endotherm.
Figure 4:
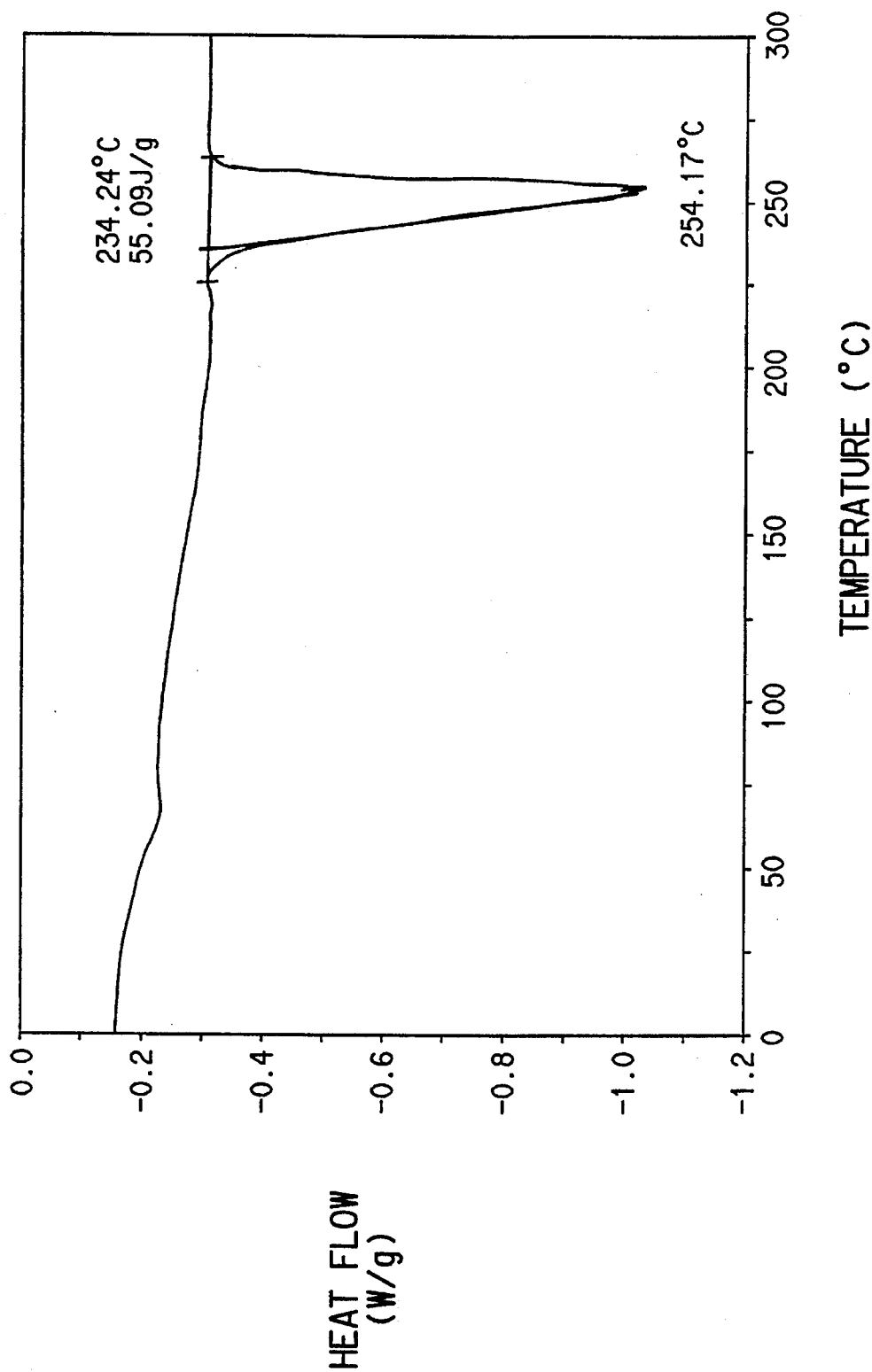
FIG. 4 is a graph of heat flow versus temperature, produced by a differential scanning calorimeter measurement of a sample of a low molecular weight poly(ethylene terephthalate) pellet made by the process of this invention by thermal shock crystallization in which just-formed PET droplets, initially at a temperature above the melt temperature, are exposed to a heated moving surface at a temperature of 170° C. for 28 seconds, which graph does not have a distinct pre-melting endotherm.

As indicated earlier, FIG. 2 shows a DSC curve for PET, not according to the invention, having a premelting endotherm. FIGS. 3 and 4 are DSC curves for PET pellets, made by the process of this invention, which show no premelting endotherms.

Also, as mentioned above, the crystallized pellets are especially useful for solid-state polymerization (SSP), in view of the amount and quality of crystallization within the pellets. Solid-state polymerization is well known to the artisan. See, for instance, F. Pilati in G. Allen, et al., Ed., *Comprehensive Polymer Science*, Vol. 5, p. 201–216 (Pergamon Press, Oxford 1989), which is hereby incorporated by reference. Solid-state polymerization is particularly useful for making higher molecular weight PETs. In general, particles of PET are heated to a temperature below the melting point and a dry gas, usually nitrogen, is passed, usually concurrently in continuous operation, around and over the particles. At the elevated temperature, transesterification and polycondensation reactions proceed, and the gas can be employed to carry away the volatile products (similar other methods, such as employing a vacuum, may be used for this purpose), thereby driving the PET molecular weight higher.

In the past, a number of problems or difficulties have been associated with the solid-state polymerization of PET. In particular, the particles to be polymerized usually have had to undergo an annealing process, so that when they are heated during solid-state polymerization, they do not undergo partial melting and stick together. If, alternatively, the polymerization occurs at a relatively lower temperature to avoid sticking, this would increase the polymerization time, since the reactions which drive the molecular weight up proceed faster at higher temperatures. In either event, these difficulties or problems tend to make the solid-state polymerization process more expensive to run.

Advantageously, polyester pellets made by the process of the present invention may show superior crystalline morphology. For example, PET pellets may be made which can be directly polymerized (preferably without further crystallization or annealing) starting at higher temperatures, for instance 230° C., preferably 240° C. The need for a lengthy annealing step, which lengthens the overall process time is thereby avoided. In addition, particles produced according to the present process may, in some cases at least, be more resistant to attrition, preventing the particles from wearing against each other or the reactor in which it is contained. Thus, the use of the particles produced according to the present invention can result in an improved process for solid-state polymerization.

In any polymerization of low molecular weight polyester to higher molecular weight polyester, normal additives, such as polymerization catalysts, may be present. These may have been added when the low molecular weight polyester was formed. For example, a typical catalyst is $Sb_2O_3$, whose concentration herein is given as the level of elemental antimony. Because of the higher starting polymerization temperatures in solid state polymerization using the crystalline low molecular weight polyester, as described herein, it may be possible to use lower catalyst levels while maintaining useful polymerization rates. Lower catalyst levels may be advantageous when the polyester is intended for use in making certain products, for example, when the polyester is intended for use in making bottles which will store beverages for human consumption.

To provide an example of one embodiment of the present invention, PET pellets can be made which have an average crystallite size of about 9 nm or more, preferably 10 nm or more, more preferably about 12 nm or more, and especially preferably about 14 nm or more. The average crystallite size is measured by wide angle X-ray powder diffraction, an exemplary method or procedure for which is as follows.

Figure 5:
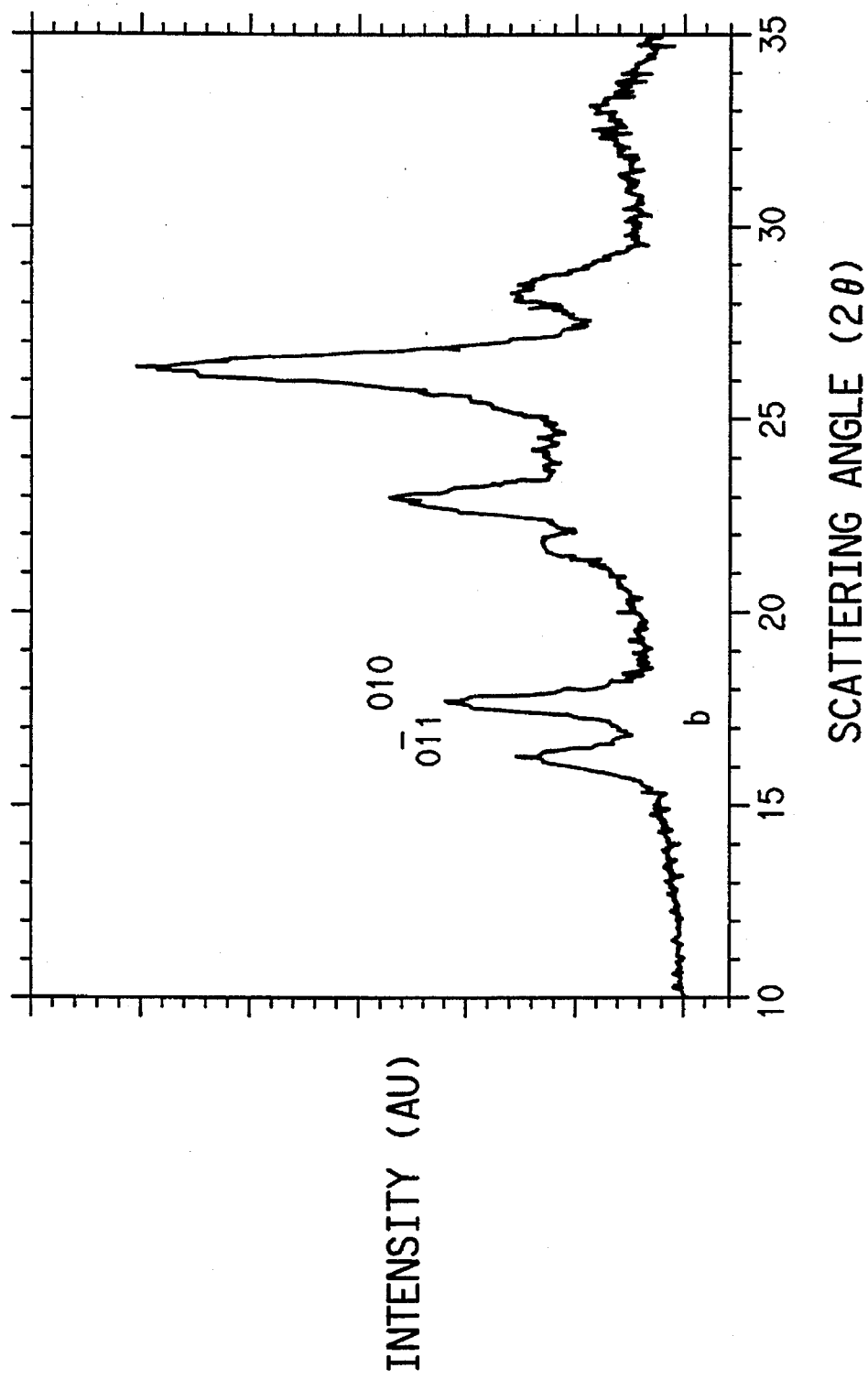
FIG. 5 is an illustrative X-ray diffraction pattern of a sample of a PET polymer made according to the process of the present invention.

PET samples of uniform thickness for X-ray measurements are produced by cryogrinding the PET in a SPEX® Freezer/Mill (Metuchen, N.J.) under liquid nitrogen for 30 seconds and then compressing the PET into disks approximately 1 mm thick and 32 mm in diameter. Because of the fragile nature of some of the PET disks, all disks are mounted on standard sample holders using 3M Scotch® double-sided sticky tape. Consequently, it is necessary to collect powder diffraction patterns of the PET disks (+tape) and a tape control. While it is preferable that the sample's patterns are collected over the range 15°–19° 2θ (as shown in FIG. 2), the patterns of the samples (+tape) and a tape control can be collected over the range 10°–35° 2θ in some cases, as was obtained for some of the samples (as shown in FIG. 5). The diffraction data are collected using an automated Philips diffractometer operating in the transmission mode (CuKα radiation, curved diffracted beam monochrometer, fixed step mode (0.05°/step), 65 sec./step, 1° slits, sample rotating). After subtracting the powder diffraction pattern for the tape control is subtracted from each of the sample-plus-tape (sample+tape) diffraction patterns, Lorentz-polarization corrections are applied to each powder pattern.

To remove the local background scattering from the 15°–19° 2θ region of each powder pattern, a straight line extending from 15.00° to 19.00° 2θ is defined and subtracted. This region of the diffraction pattern has been found to contain two crystalline reflections, at approximately 16.5° and 17.8° 2θ, that have been defined as the $(0\bar{1}1)$ and (010) reflections, referred to by N. S. Murthy, et at., in Polymer, vol. 31, p. 996–1002, herein incorporated by reference.

Figure 6:
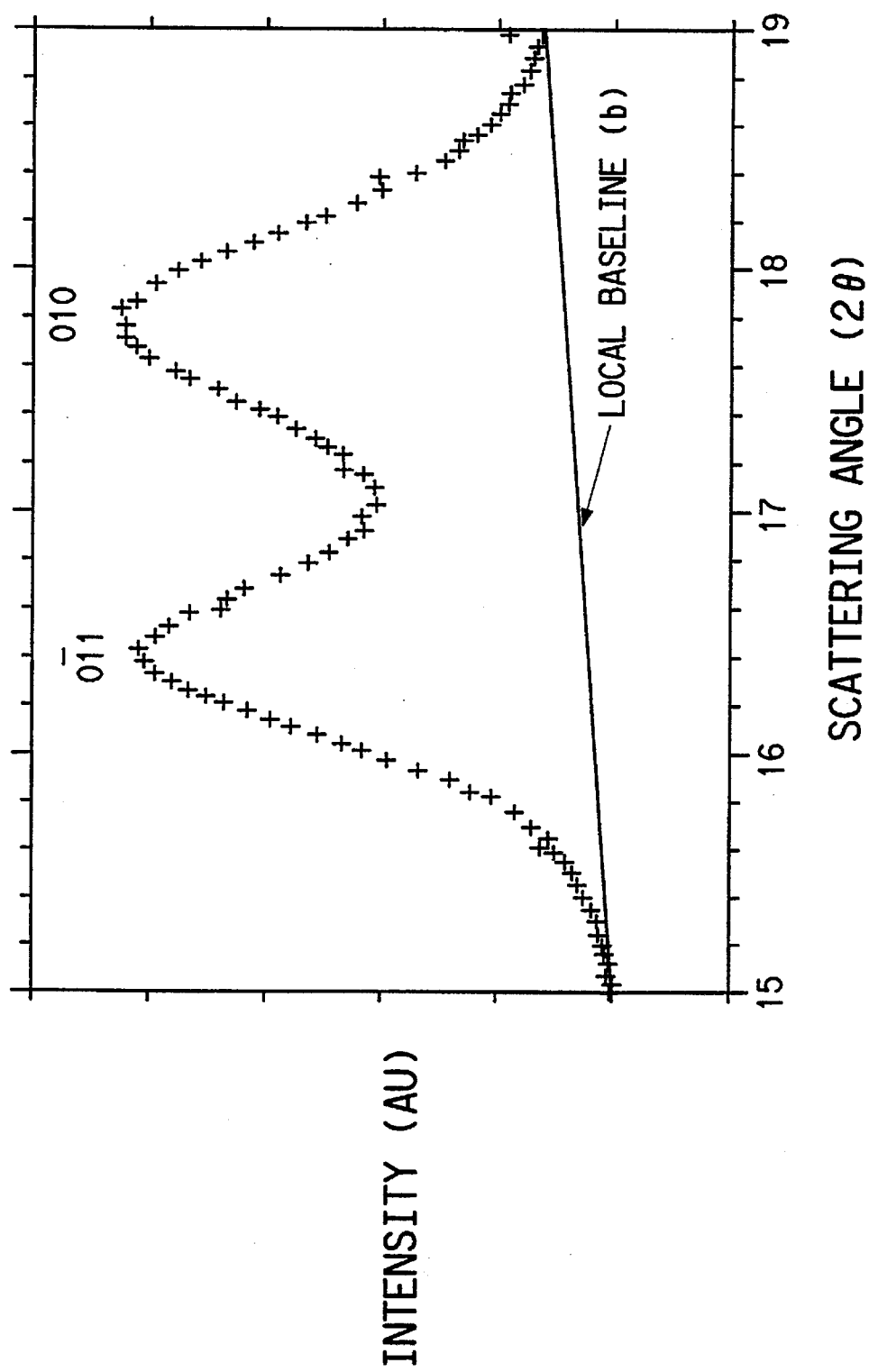
FIG. 6 is another illustrative X-ray diffraction pattern of a sample of a PET polymer made according to process of the present invention.

FIGS. 5 and 6 show the diffraction patterns, corrected as detailed above, collected over the 2θ range 10°–35° and 15°–19°, respectively. In addition to the Miller indices of the reflections of interest, the local "artificial" background between 15° and 19° 2θ, labeled "b", and described above, is shown.

Figure 7:
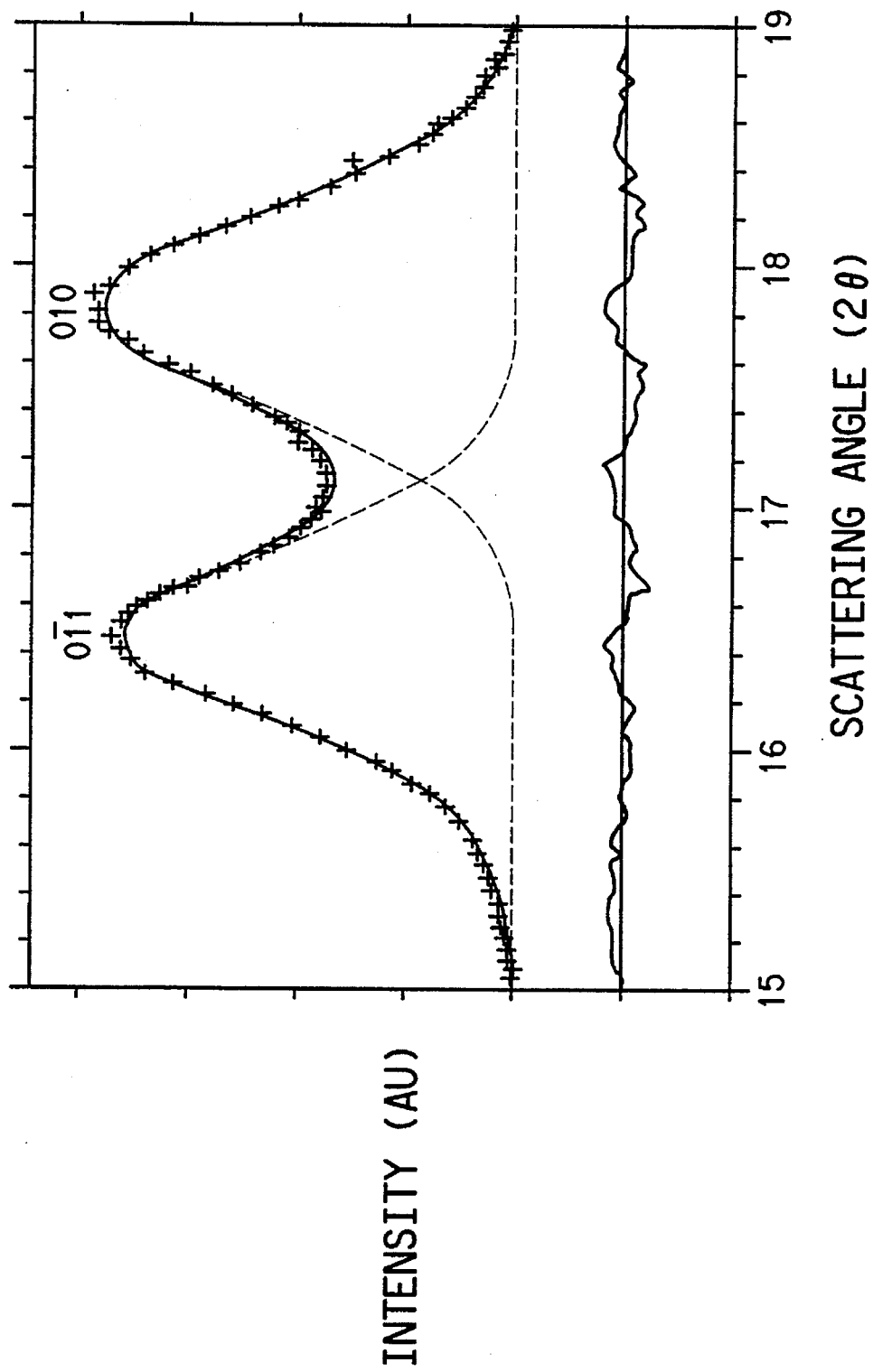
FIG. 7 is an illustrative X-ray diffraction pattern of a sample of a PET polymer made according to a process of the present invention, which pattern has been deconvoluted into two overlapping Gaussian peaks.

The 15°–19° region is then deconvoluted into two overlapping Gaussian peaks corresponding to the two crystalline reflections, and the position, width, and height of both peaks are extracted. An example of this deconvolution is shown in FIG. 7. The, apparent crystallite size for the (010) reflection (herein sometimes also referred to simply as apparent crystallite size), $ACS_{010}$, is calculated from the reflection's position and full width at half height using the Scherrer equation, as for instance described by L. E. Alexander, *X-Ray Diffraction Methods in Polymer Science*, p. 335 et seq. (John Wiley & Sons, New York, 1969):

$$ACS_{010} = \frac{K\lambda}{\beta_{010}\cos\theta_{010}}$$

where $ACS_{010}$ is the mean dimension of the crystal, K is assumed to be 1.0, λ is the wavelength, β is the full width at half height of the profile, in radians, and q has its normal meaning.

In the following Examples, certain analytical procedures are used. Aside from X-ray diffraction, which is described in detail above, these procedures are described below. References herein to these types of analyses, or their results, correspond to these exemplary procedures.

Intrinsic Viscosity (IV)

A solvent is made by mixing one volume of trifluoroacetic acid and three volumes of methylene chloride. PET, in the amount of 0.050 g, is then weighed into a clean dry vial; and 10 mL of the solvent is added to it using a volumetric pipette. The vial is closed (to prevent evaporation of the solvent) and shaken for 30 min or until the PET is dissolved. The solution is poured into the large tube of a #50 Cannon-Fenske® viscometer, which is placed in a 25° C. water bath and allowed to equilibrate to that temperature. The drop times between the upper and lower marks are then measured in triplicate, and should agree within 0.4 sec. A similar measurement is made in the viscometer for the solvent alone. The IV is then calculated by the equation:

$$IV = Ln\frac{(\text{solution time/solvent time})}{0.5}$$

Gel Permeation Chromatography (GPC)

GPC was run in a Waters® 150C ALC/GPC instrument, using as a solvent hexafluoroisopropanol (HFIP) containing 1.3637 g of sodium trifluoroacetate per L. The instrument was run in the usual way, and standard calculations were made to determine $M_n$ (number average molecular weight) and $M_w$ (weight average molecular weight). Calibration of the instrument was made using a PET sample with $M_n$ 22,800 and $M_w$ 50,100.

Melting Point and Glass Transition Temperature

Melting point was determined by Differential Scanning Calorimetry (DSC) and all samples were analyzed using a TA Instruments® DSC 910. The instrument was calibrated with indium consistent with the system documentation. The samples were analyzed as received, no pre-grinding, using 5–10 mg±0.005 mg. The samples were sealed in aluminum pans then heated from room temperature to 300° C. at 10° C./min. in a nitrogen purged environment. Glass transition temperature, melting point temperature and heat of fusion calculations were done with the TA Instrument software. The reported DSC peak melting temperature is the corresponding temperature of the peak in the main melting endotherm.

Thennomechanical Analysis

A Mettier® TMA 40 Analyzer coupled to a TSC 10A controller was used for all samples. This instrument was calibrated for temperature using the standard operating procedure illustrated in the instruction manual at 1 month intervals or when spurious results were suspected. The samples had no extra pre-treatment in the TMA system that would alter the samples inherent morphological history. The partial hemispherical particles were loaded in the system in contact with both the quartz sample holder and a 3 mm diameter probe such that the sample was convex side up with the probe in contact with the apex of the hemisphere. Two temperature profiles were used to analyze the samples. The first being a high speed scanning rate of 10° C./min. from room temperature through the melt and the second, to ensure a homogeneous heat environment, being a 1° C. rate from 200° C. to the melt.

EXAMPLES

Example 1—Thermal Shock Crystallization (TSC of Solid Amorphous Particles

PET with an IV of 0.18 dl/g and COOH ends of 167.5 Eq/$10^6$ g was produced by a melt-phase polymerization process and contained approximately 275 ppm Sb as a catalyst. The melt was then extruded through a 1 mm diameter orifice to from droplets. The droplets fell through an air gap of about 10 cm into chilled water to form clear amorphous particles. The particles were shaped like pancakes, approximately 8 mm in diameter and 2.2 mm thick. The particles were crystallized one at a time in a Mettler TMA 40 coupled to a Mettler Thermal Controller 10A. The individual particle was placed on top of the quartz sample holder at room temperature. The oven was pre-heated to 400° C., lowered over the sample for 15 seconds, then removed allowing the particle to cool back to room temperature. After exposure to the oven the particle was opaque. DSC analysis of the crystallized sample indicated no pre-melting endotherms. The peak melting temperature was 250.1° C. The $ACS_{010}$ was 11.6 nm.

The time it takes to crystallize a particle depends on the molecular weight of the polymer, the size/geometry of the particle, the geometry of the heating source and the temperature of the heating source. To determine the effect of imposed temperature on crystallization rate, more of the above particles were crystallized in the TMA at various temperatures following the same procedure as described above. The time to crystallize is the elapsed time from when the oven is initially placed around the particle until the particle is observed to be completely opaque. The particle is viewed through the top opening in the oven. Oven temperature and time required to crystallize are given in Table I.

TABLE I

| Run No. | Oven Temperature (°C.) | Time to Crystallize (sec) |
|---|---|---|
| 1 | 300 | 42 |
| 2 | 400 | 15 |
| 3 | 500 | 11 |
| 4 | 600 | 9 |
| 5 | 700 | 5 |
| 6 | 800 | 3 |

Example 2—From Melt onto Hot Plate

PET with an IV of 0.15 dl/g, and COOH ends of 188.2 Eq/$10^6$ g, which had been produced by a melt-phase polymerization process and which contained approximately 275 ppm Sb as a catalyst, was heated in a Melt Indexer at 290° C. until the polymer dripped out of the orifice (1 mm in diameter) under its own weight. A hot plate covered with a 1.9 cm thick steel plate was placed 15 to 25 cm under orifice of the melt indexer. The temperature was monitored by a thin-wire thermocouple kept in intimate contact with the steel plate. The polymer dripped onto the hot steel plate which was at 180° C. Crystallization was monitored by observing the clear amorphous drop turn into an opaque solid. Once it was opaque the metal surface was tipped at an angle to horizontal so the particle would slide off and cool to room temperature. The particles were shaped like pancakes, approximately 5.6 mm in diameter and 8.7 mm thick. DSC analysis of the crystallized sample indicated no pre-melting endotherms. The peak melting temperature was 250.3° C. Two particles formed by this method were placed one on top of the other in a quartz sample holder in a TMA and a load of 0.5 N was applied on them with the probe. The particles showed no signs of adhesion after being held for 30 minutes at 240° C. under this load.

PET with an IV of 0.24 dl/g and COOH ends of 27.8 Eq/$10^6$ g, which had been produced by a melt-phase polymerization process and which contained approximately 275 ppm Sb as a catalyst, was heated in a Melt Indexer at 290° C. until the polymer dripped out of the orifice (1 mm in diameter) under its own weight. A hot plate covered with a 1.9 cm thick steel plate was placed 15 to 25 cm under the melt indexer. The temperature was monitored by a thin-wire thermocouple kept in intimate contact with the steel plate. The polymer dripped onto the hot steel plate which was at 180° C. Crystallization was monitored by observing the clear amorphous drop turn into an opaque solid. Once it was opaque the metal surface was tipped at an angle to horizontal so the particle would slide off and cool to room temperature. The particles were shaped like hemispheres, approximately 4.5 mm in diameter and 2.5 mm thick. DS C analysis of the crystallized sample indicated no pre-melting endotherms. The peak melting temperature was 258.7° C. Two particles formed by this method were placed one on top of the other in a quartz sample holder in the TMA and a load of 0.5 N was applied on them with the probe. The particles showed no signs of adhesion after being held for 30 minutes at 240° C. under this load.

Example 3—From Melt onto Turntable

PET with an IV of 0.21 dl/g and COOH ends of 141.0 Eq/$10^6$ g, which had been produced by a melt-phase polymerization process and which contained approximately 275 ppm Sb as a catalyst, was melted and processed at 255°–280° C. through a 16 mm twin screw extruder at 0.5 lb/hr. The melt extruded through a 1.0 mm die forming individual droplets that fell 1.3 cm through room temperature air onto a heated turntable. The turntable provided precise regulation of surface temperature and residence time on the heated surface, with continous particle formation from the extruder. The device consisted of a rotary actuator driven by a stepper motor, a rotating stainless steel turntable in contact with a stationary heated plate. The temperature of the turntable surface was controlled through manipulation of the temperature of the stationary plate. A calibration curve was generated for the controlled measured temperature of the stationary plate versus the surface temperature of the turntable so that a thermocouple did not have to be attached to the rotating turntable during the crystallization. After about 300° of rotation on the turntable the crystallized particles hit a block of Teflon® fluoropolymer which knocked them off the turntable and into a room temperature collection pail. For particles formed at surface temperatures between 160°–200° C. there were no premelting endotherms in the DSC traces. Processing conditions and particle analyses are listed in Table II:

TABLE II

| Run No. | Table Temp (°C.) | Time on Table (sec) | DSC Peak Melting Temp (°C.) | $ACS_{010}$ (nm) |
|---|---|---|---|---|
| 1 | 160 | 28 | 255.4 | 12.5 |
| 2 | 160 | 23 | 254.1 | 10.0 |
| 3 | 170 | 23 | 255.5 | 10.9 |
| 4 | 170 | 45 | 255.5 | 10.0 |
| 5 | 190 | 45 | 253.1 | 12.0 |

TABLE II-continued

| Run No. | Table Temp (°C.) | Time on Table (sec) | DSC Peak Melting Temp (°C.) | $ACS_{010}$ (nm) |
|---|---|---|---|---|
| 6 | 190 | 28 | 254.8 | 12.5 |
| 7 | 200 | 45 | 254.4 | 13.8 |
| 8 | 200 | 60 | 254.2 | 12.6 |

Comparative Example 4

To demonstrate the necessity of having the table temperature hot enough so that the particles crystallize and are not partially quenched to the amorphous state the same polymer and procedure was used as described in Example 3, except the table was at lower temperatures. Four runs were made keeping the particles on the table for 28 seconds. The amount of amorphous material in a sample was determined from the DSC trace. Amorphous material that is readily crystallizable will crystallize during the DSC analysis and is observed as an exothermic peak. The amount of amorphous material is quantified by the size of the exothermic peak expressin in J/g. Run no. 1 in Table III shows that the lowest table temperature produces the largest amount of amorphous material. Using this polymer and processing conditions the table temperature had to be at least 100° C. to produce a good particle.

TABLE III

| Run No. | Table Temperature (°C.) | Time on Table (sec) | Size of Crystallization Exotherm (J/g) |
|---|---|---|---|
| 1 | 24 | 28 | 6.00 |
| 2 | 40 | 28 | 4.03 |
| 3 | 80 | 28 | 0.97 |

Example 5—From Melt onto Turntable

PET with an IV of 0.17 dl/g and COOH ends of 98.0 Eq/$10^6$ g, which had been produced by a melt-phase polymerization process and which contained approximately 275 ppm Sb as a catalyst, was melted and processed through a 16 mm twin screw extruder and dropped onto a heated turntable as described in Example 3. Processing conditions and particle analyses are listed in Table IV:

TABLE IV

| Run No. | Turntable Temperature (°C.) | Time on Turntable (sec) | DSC Peak Melting Temperature (°C.) | $ASC_{010}$ (nm) |
|---|---|---|---|---|
| 1 | 120 | 10 | 251.9 | 11.3 |
| 2 | 120 | 28 | 251.9 | 11.7 |
| 3 | 120 | 60 | 251.5 | 11.4 |
| 4 | 160 | 28 | 251.8 | 13.6 |
| 5 | 160 | 60 | 251.9 | 16.2 |
| 6 | 170 | 28 | 252.6 | 13.4 |
| 7 | 200 | 60 | 252.3 | 15.2 |

We claim:

1. A process for the crystallization of a low molecular weight polyester pellets having an average diameter of between 500 micrometers and 2 cm, which process comprises heating essentially amorphous solid pellets of a polyester oligomer, having a degree of polymerization (DP) of 2 to 40 and a glass transition temperature ($T_g$) above 25° C., from an initial temperature $T_0$, wherein $T_0$ is below $T_g+20°$ C., so that the bulk average temperature of the pellets is brought, within 15 seconds, to a temperature within a range extending from $T_{min}$ to $T_{max}$ wherein $T_{min}=T_c-0.5(T_c-T_g)$, $T_{max}=T_c+0.5(T_m-T_c)$, $T_c$ is the calculated temperature of the maximum crystallization rate of the oligomer, defined as $T_c=0.5(T_m+T_g)$, and $T_m$ is the melting point of the oligomer, and, furthermore, upon reaching said temperature, maintaining said pellets within said range for at least 3 seconds.

2. A process for the crystallization of a low molecular weight polyester pellets having an average diameter of between 500 micrometers and 2 cm, which process comprises cooling molten droplets of a polyester oligomer, having the DP and $T_g$ described above, from an initial temperature $T_1$, wherein $T_1$ is at least the melting point $T_m$ of the polyester oligomer, so that the bulk average temperature of the droplets or crystallizing pellets is brought, within 15 seconds, to a temperature within a range extending frown $T_{min}$ to $T_{max}$ wherein $T_{min}=T_c-0.5(T_c-T_g)$, $T_{max}=T_c+0.5(T_m-T_c)$, $T_c$ is calculated temperature of the maximum crystallization rate of the oligomer, defined as $T_c=0.5(T_m+T_g)$, and $T_m$ is the melting point of the oligomer and, furthermore, upon reaching said temperature, maintaining said pellets within said range for at least 3 seconds.

3. A process for forming an essentially-crystalline polyester pellets having an average diameter of between 500 micrometers and 2 cm, from an essentially-amorphous melt, which process comprises the following steps:

(a) forming: molten droplets of a polyester oligomer at a temperature $T_1$ wherein $T_1$ is at least the melting point $T_m$ of the polyester oligomer and wherein the polyester oligomer has a degree of polymerization (DP) of 2 to 40 and a glass transition temperature ($T_g$) above 25° C.;

(b) crystallizing said molten droplets by placing the droplets in contact, for at least 3 seconds, with a solid surface which is at a temperature within the range of $T_{min}$ to $T_{max}$ as defined below, whereby the droplets or crystallizing pellets sustain a rapid change in temperature towards said temperature and remain at a temperature within said range for a sufficient period of time;

wherein $T_{min}=T_g+10°$ C., $T_{max}=T_c+0.5(T_m-T_c)$, wherein $T_c$ is the calculated temperature of the maximum crystallization rate of the oligomer, defined as $T_c=0.5(T_m+T_g)$;

except that, if the solid surface has a heat transfer coefficient ($h_s$) which is below 1.5 Joules/sec cm$^2$°C., then $T_{min}$ of the solid surface may be between 0° C. and ($T_g+10°$ C.) provided that the bulk average temperature of the pellets remains above $T_{min}$ for at least 3 seconds after the pellets contact the solid surface and provided that the bulk average temperature of the pellets reaches $T_{max}$ within 15 seconds after the pellets contact the solid surface.

4. A process for forming an essentially-crystalline polyester particles having an average diameter of between 500 micrometers and 2 cm, said process comprising the following steps:

(a) obtaining pellets of an essentially-amorphous, solid polyester oligomer at a temperature $T_0$ wherein the polyester oligomer has a degree of polymerization (DP) of 2 to 40 and a glass transition temperature ($T_g$) above 25° C.;

(b) heat treating the pellets by contacting them with a gas at a temperature of at least $T_{min}$ for at least about 0.5 seconds, wherein $T_{min}$ is at least the melting point of the polyester oligomer.

5. The process of claim 1 or 2, wherein $T_{max}=T_c+0.3(T_m-T_c)$ and $T_{min}=T_c-0.3(T_cT_g)$.

6. The process of claim 1 or 2, wherein $T_{min}=T_c-30°$ C. and $T_{max}=T_c+30°$ C.

7. The process of claim 3, wherein $T_{max}=T_c+0.3(T_m-T_c)$ and $T_{min}=T_c-0.5(T_c-T_g)$.

8. The process of claim 3, wherein $T_{min}=T_c-0.3(T_c-T_g)$.

9. The process of claim 1, wherein the bulk average temperature of the pellets is brought to said temperature within at least 3 seconds.

10. The process of claim 1, wherein the bulk average temperature of the pellets remains at said temperature for at least 60 seconds.

11. The process of claim 1, wherein the polyester is PET and $T_{max}$ is 220° C. and $T_{min}$ is 130° C.

12. The process of claim 11, wherein $T_{max}$ is 200° C. and $T_{min}$ is 150° C.

13. The process of claim 3, wherein $T_{max}$ equals $T_c+10°$ C.

14. The process of claim 3, wherein $T_1$ is between $T_m$ and $T_m+30°$ C.

15. The process of claim 3, wherein the solid surface is a metal.

16. The process of claim 3, wherein said solid surface is a moving surface for conveying the pellets.

17. The process of claim 3, wherein the pellets are exposed to said solid surface in the indicated temperature range for at least 5 seconds.

18. The process of claim 3, wherein the pellets are exposed to said solid surface in the indicated temperature range for not more than 30 minutes.

19. The process of claim 3, wherein the pellets are exposed to said solid surface in the indicated temperature range for a period of time between 10 seconds and 10 minutes.

20. The process of claim 3, wherein said time the molten droplets are exposed to said exterior change in temperature almost immediately after the molten droplets are formed.

21. The process of claim 3, wherein the molten droplets are formed by a pastillator.

22. The process of claim 3, wherein the polyester is PET and essentially-amorphous molten droplets, initially at a temperature of between 250° C., and 280° C., are crystallized by placing them in contact, for at least 3 seconds, with a solid surface which is at a temperature within the range of 80° C. and 220° C.

23. The process of claim 22, wherein the essentially-amorphous molten droplets are crystallized by placing them in contact, for at least 3 seconds, with a solid surface which is at a temperature within the range of 130° C. and 200° C.

24. The process of claim 4, wherein the pellets are heat treated by contacting them with a gas at a temperature of between $T_m$ and 2000° C. for at least about 0.5 seconds.

25. The process of claim 24, wherein the time of exposure at the indicated temperature is between about 0.5 sec and 2 min.

26. The process of claim 4, wherein the polyester is PET and the essentially-amorphous solid pellets, initially at a temperature below 90° C., are exposed for at least about 0.5 seconds to a thermal environment containing a gaseous fluid at a temperature of at least 250° C.

27. The process of claim 26, wherein said essentially-amorphous solid pellets, initially at a temperature between ambient and 90° C., are exposed for at least about 0.5 seconds to a thermal environment containing a gaseous fluid at a temperature of between 270° C. and 1500° C.

28. The process of claim 4, wherein the pellets are formed by pastillation, prilling, or melt cutting.

29. A process of producing high molecular weight polyester by introducing the polyester pellets produced according to claims 1, 2, 3, or 4 into a reactor for further polymerization.

30. The process of claim 29, wherein the reactor is a solid-state polymerization reactor essentially below the melting temperature of the material being polymerized.

31. The process of claim 29 or 30, wherein the IV of the polyester in the pellets introduced into the reactor is under 0.3 and the IV of the high molecular weight polyester that is produced has an IV of at least 0.6.

32. The process of claim 29 or 30, wherein the pellets are introduced into the reactor without any annealing steps.

33. The process of claim 29 or 30, wherein the polyester is PET.

34. A process for the crystallization of poly(ethylene terephthalate) pellets having an average size of 500 microns to 2 cm, comprising:

heating an essentially-amorphous glassy poly(ethylene terephthalate), having a degree of polymerization (DP) of 2 to 40, from an initial temperature below 90° C. to a bulk average temperature of about 120° C. to about 210° C. within a period of 15 seconds and, furthermore, upon reaching said temperature, maintaining said pellets within said range for at least 3 seconds; or, alternatively, cooling molten droplets of poly(ethylene terephthalate) oligomer, having the DP stated above, from a temperature above the melting point of the oligomer, so that the bulk average temperature of the droplets or crystallizing pellets is brought, within 15 seconds, to a temperature of 120° C. to about 210° C. and, furthermore upon reaching said temperature, maintaining said pellets within said range for at least 3 seconds.

35. The process as recited in claim 34 wherein said temperature is about 150° C. to about 190° C.

36. The process of claim 34, wherein the bulk average temperature of the pellets is brought to said temperature within at least 3 seconds.

* * * * *